(12) United States Patent
Morales (10) Patent No.: US 8,248,624 B2
(45) Date of Patent: Aug. 21, 2012

(54) VARIABLE FINISHING PROGRAMMING METHOD AND SYSTEM FOR VARIABLE INFORMATION DOCUMENTS

(75) Inventor: Javier A. Morales, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 771 days.

(21) Appl. No.: 12/418,156

(22) Filed: Apr. 3, 2009

(65) Prior Publication Data
US 2010/0253969 A1    Oct. 7, 2010

(51) Int. Cl.
*G06F 3/12* (2006.01)
*G06K 15/00* (2006.01)

(52) U.S. Cl. .................. 358/1.13; 358/1.9; 358/2.1

(58) Field of Classification Search ........... 358/1.15, 358/1.13, 1.16, 1.12, 1.18, 442, 402, 448, 358/404, 474, 1.9, 2.1; 709/201, 203, 217, 709/229
See application file for complete search history.

(56) References Cited

U.S. PATENT DOCUMENTS

| | | | |
|---|---|---|---|
| 6,549,299 B1 | 4/2003 | Allen et al. | 358/1.18 |
| 7,125,179 B1 | 10/2006 | Rai et al. | 400/62 |
| 7,430,056 B2 | 9/2008 | Rai et al. | 358/1.15 |
| 7,451,140 B2 | 11/2008 | Purvis et al. | 707/5 |
| 7,747,185 B2 * | 6/2010 | Kimoto et al. | 399/81 |
| 7,855,799 B2 * | 12/2010 | Shah | 358/1.15 |
| 8,089,642 B2 * | 1/2012 | Taira | 358/1.13 |
| 2006/0279783 A1 * | 12/2006 | Kato | 358/1.18 |
| 2008/0170254 A1 * | 7/2008 | Shah | 358/1.15 |

OTHER PUBLICATIONS

FreeFlow Variable Information Suite 7.0, Version 1.2, Customer Expectations Document, Oct. 2008, Xerox Corporation.
FreeFlow VI Suite 7.0, Digital Workflow Collection, Xerox Corporation.
FreeFlow Variable Information Workflow, http://www.imaging.org/store/epub.cfm?abstrid=32312.

* cited by examiner

*Primary Examiner* — Jerome Grant, II
(74) *Attorney, Agent, or Firm* — Kermit D. Lopez; Luis M. Ortiz; Melissa Asfahani (57) ABSTRACT

A method and system for applying one or more variable finishing parameters to a rendering job associated with VI transactional printing process. A set of rules can be specified by a user for determining the finishing attributes for the rendering job based on characteristics of the job being rendered. The rendering job can be received for execution and the discrete VI records associated with the rendering job can be discerned. The variable finishing parameters can be applied to the rendering job based on the properties required to determine a correct finishing for a given record, a job ticket resolution, and a post RIP job ticket resolution. The dynamically selected finishing attributes can be applied to the entire document and/or individual records associated with the VI data stream.

20 Claims, 5 Drawing Sheets

VARIABLE FINISHING PROGRAMMING METHOD AND SYSTEM FOR VARIABLE INFORMATION DOCUMENTS

TECHNICAL FIELD

Embodiments are generally related to rendering devices and techniques. Embodiments also relate in general to the field of computers and similar technologies and in particular to software utilized in this field. In addition, embodiments also relate to methods and systems for configuring variable finishing parameters for variable information (VI) documents.

BACKGROUND OF THE INVENTION

Variable information (VI) printing is a form of on-demand printing in which elements such as, for example, text, graphics, and images may be changed from one printed piece to the next without stopping or slowing down the printing process or utilizing information from a database or external file. For example, a set of personalized letters, each with the same basic layout, can be rendered with a different name and address on each letter. Variable data printing is mainly utilized for direct marketing, customer relationship management, and advertising and invoicing. Variable information printing can be automated by performing a multi-step programming that initially creates document information, which includes a number of prepress operations that can be utilized to render the document in a suitable form.

Modern rendering systems such as printers typically provide document finishing options such as, for example, scaling, rotation, skewing, stapling, hole punching, folding, and other options. In most prior art approaches, such document finishing options are determined by a user at a printer station and/or at a workstation after the document has been created. Such an approach leads to confusion regarding the correct setting of the finishing options. Also, there are significant problems with current methods of selecting finishing parameter options for variable information documents.

Such finishing option programming techniques require a user to define output finishing parameters. Unfortunately, the user necessarily parses through various finishing options and therefore may make many comparisons and decisions in order to achieve the desired outcome. Typically, the special behaviors and conflicts of such finishing system are confusing, awkward to the user, and difficult to understand. Such an approach can be problematic due to employee inattention, which in turn may lead to waste of expensive media.

Based on the foregoing, it is believed that a need exists for an improved method and system for configuring variable finishing parameters for a variable information document. Such an improved method and system is described in greater detail herein.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved data-processing method, system, and computer-usable medium.

It is another aspect of the present invention to provide for an improved method and system for configuring rendering devices such as printers, scanners, multi-function devices, photocopy machines, and the like.

It is a further aspect of the present invention to provide for an improved method and system for dynamically applying variable finishing parameters to a rendering job (e.g. variable information document).

The aforementioned aspects and other objectives and advantages can now be achieved as described herein. A method and system for applying one or more variable finishing parameters to a rendering job associated with a VI transactional rendering process is disclosed. Note that as utilized herein, the acronym VI generally refers to "Variable Information" and the acronym RIP generally refers to "Raster Image Processor". The disclosed approach can also be employed to automatically generate and render (e.g., print) the required variable information document.

A set of rules can be specified by a user for determining the finishing parameters for the rendering job (e.g., print job) based on the characteristics of the rendering job. The rendering job, which can include the VI data fields, can be received for execution and the discrete VI records associated with the job can be discerned. The variable finishing parameters can be applied to the rendering job based on the properties required to determine a correct finishing for a given record, a job ticket resolution, and a post RIP job ticket resolution. If the finishing parameters can be ascertained, then the job programming for the rendering job can be finalized and processed.

The dynamically selected finishing parameters can be applied to the entire document and/or individual records associated with the VI data stream. If the properties that are required to determine the correct finishing for a given record cannot be discerned, the job ticket resolution operation can be added before rendering starts. Thereafter, the discrete records associated with the VI PDL can be discerned during processing. If the records can be discerned during processing, the system can evaluate each processed job to determine the required information. If the system is completely unable to discern the required information, one or more default-finishing parameters can be applied to the rendering job and/or the rendering job can be put on hold.

The nominal processing of the rendering job can be stopped at the end of every operation to determine whether the system possess the required information to finalize the job programming. The document can be raster image processed once again utilizing the desired prepress and finishing operations if the desired programming is incompatible with the required finishing. An alternate set of rules can also be dynamically created or modified utilizing one or more information (e.g., dimensions, media selection, and number of pages, print quantity and customer information) typically available to the system.

Such an approach enables end-to-end production automation for the VI data streams that require variable finishing on a per record basis and enable appropriate finishing for the VI data streams that do not possess accurate pre-RIP record delineation. Such a rules-based, dynamic selection of finishing attributes provides production flexibility without depending on explicit support from an inflexible upstream content management system.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope of such embodiments.

Figure 1:
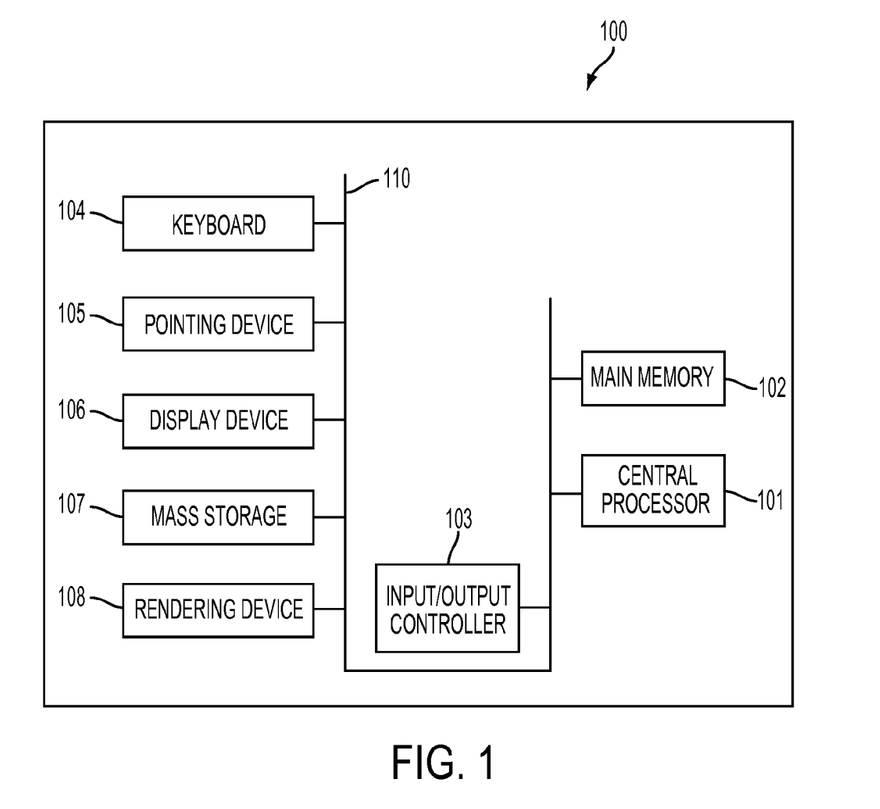
FIG. 1 illustrates a data-processing apparatus in which the present invention may be embodied.
Figure 2:
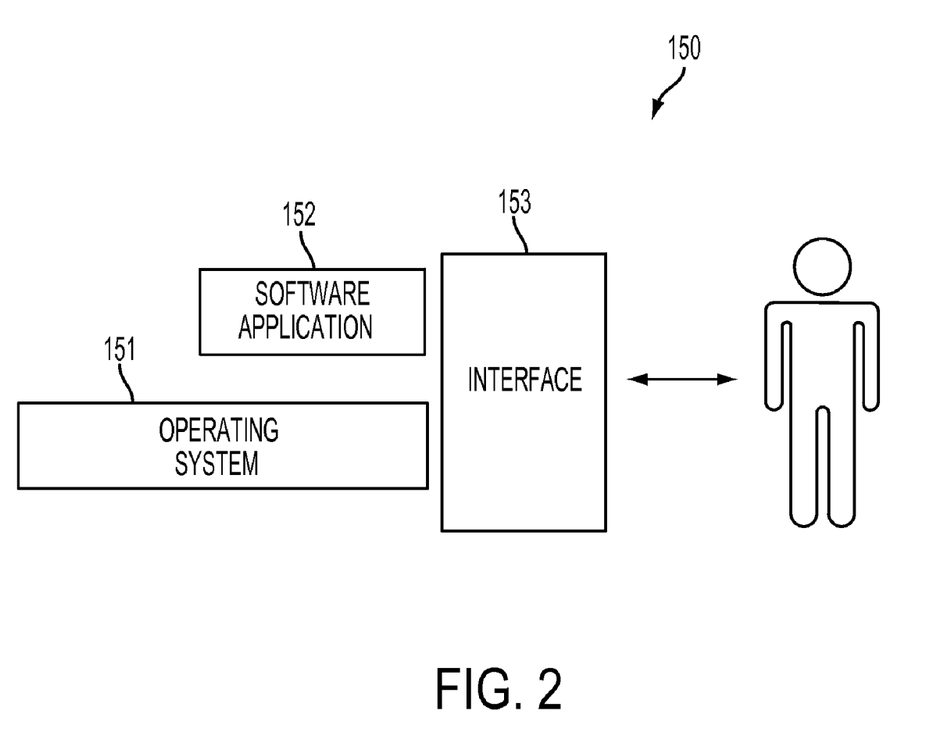
FIG. 2 illustrates a schematic view of a software system including an operating system, application software, and a user interface for carrying out the present invention.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

As depicted in FIG. 1, the present invention may be embodied and/or implemented in the context of a data-processing system 100 that generally includes a central processor 101, a main memory 102, an input/output controller 103, an input device such as, for example, a keyboard 104, a pointing device 105 (e.g., mouse, track ball, pen device, or the like), a display device 106, and a mass storage 107 (e.g., hard disk). Additional input/output devices, such as a rendering device 108, may be utilized in association with the data-processing system 100 as desired. As illustrated, the various components of the data-processing system 100 communicate through a system bus 110 or similar architecture.

Illustrated in FIG. 2, a computer software system 150 is provided for directing the operation of the data-processing system 100. Software system 150, which is stored in system memory 102 and on disk memory 107, includes a kernel or operating system 151 and a shell or interface 153. One or more application programs, such as application software 152, may be "loaded" (i.e., transferred from storage 107 into memory 102) for execution by the data-processing system 100. The data-processing system 100 receives user commands and data through user interface 153; these inputs may then be acted upon by the data-processing system 100 in accordance with instructions from operating module 151 and/or application module 152.

The interface 153, which is preferably a graphical user interface (GUI), also serves to display results, whereupon the user may supply additional inputs or terminate the session. In one particular embodiment, operating system 151 and interface 153 can be implemented in the context of a "Windows" system. In another embodiment, operating system 151 and interface 153 may be implemented in the context of other operating systems such as Linux, UNIX, etc. Application module 152, on the other hand, can include instructions, such as the various operations described herein with respect to the various components and modules described herein such as, for example, the methods 400 and 500 depicted in FIGS. 4-5.

The following description is presented with respect to embodiments of the present invention, which can be embodied in the context of a data-processing system such as data-processing system 100 and computer software system 150 depicted respectively in FIGS. 1-2. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Figure 3:
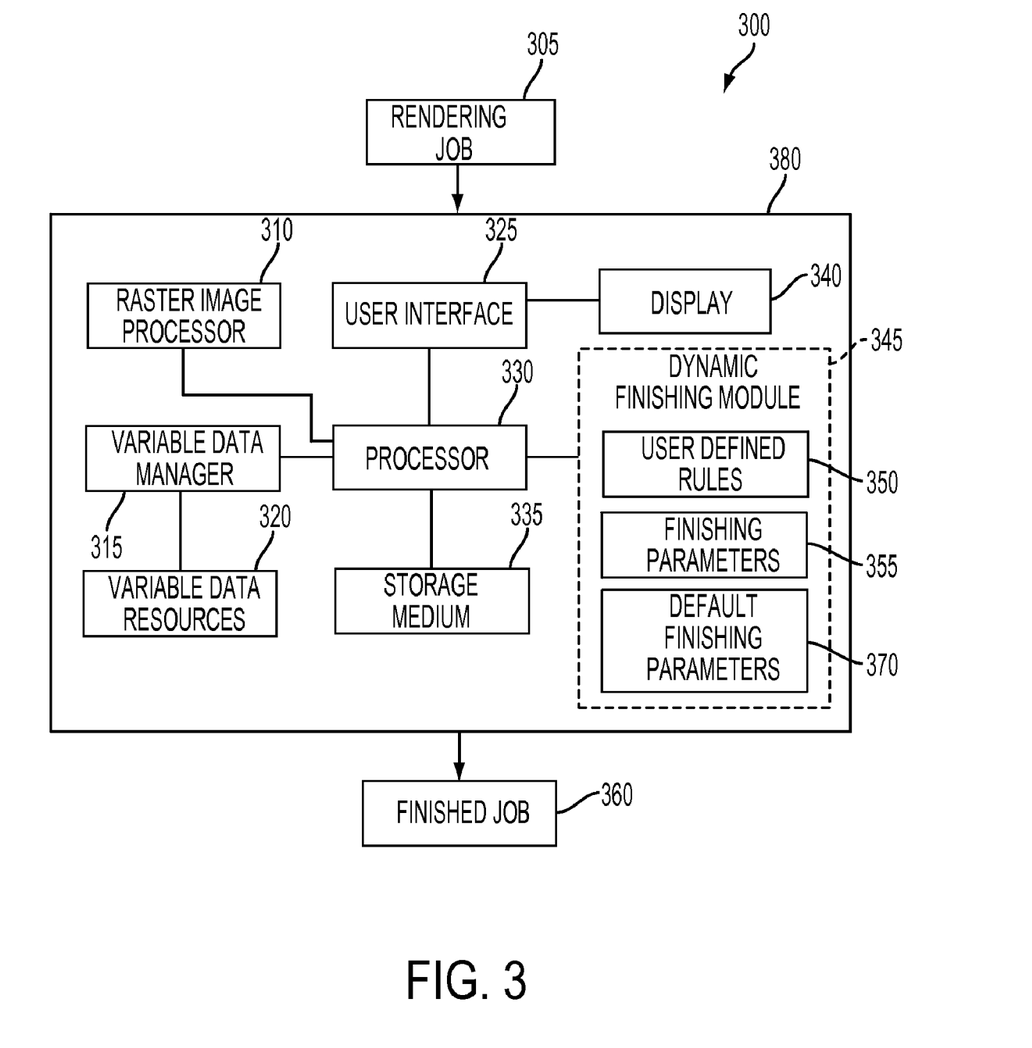
FIG. 3 illustrates a block diagram of a system for configuring variable finishing parameters for a variable information document, in accordance with a preferred embodiment.

FIG. 3 illustrates a block diagram of a variable information document rendering system 300 for configuring variable finishing parameters 355 for a variable information document 305, in accordance with a preferred embodiment. Note that in FIGS. 1-5, identical or similar blocks are generally indicated by identical reference numerals. Variable information rendering (e.g., printing) combines a predefined document layout with a combination of static and dynamic text and graphic elements to create one-of-a-kind pages at an extremely high speed. For example, the VI document rendering system 300 can be operated to produce a number of multiple-page books in the form of a brochure. A variable data resource 320 can specify control information and the content of variable information to be placed in variable information areas on pages of the book.

The system 300 generally includes a workstation 380. The workstation 380 includes a user interface 325 for receiving commands and instructions from a user and a display device 340 for displaying instructions and documents to the user. Note that system 300 may constitute, for example, a printer, a copier, fax machine, scanner, and/or other types of rendering components, depending upon design considerations. Thus, the system 300 may be a standalone single function device such as a dedicated printer, scanner, copy machine, etc. The system 300 can also be, for example, a multi-function device capable of multiple rendering functions such as printing, copying, scanning, faxing, etc. The system 300 may also be, for example, a photo processing and/or image processing device such as those utilized in retail photo processing establishments and businesses.

The workstation 380 includes a processor 330 and a storage medium 335 suitable for running a dynamic finishing module 345 required to configure the finishing parameters 355 for the variable information document 305. A raster image processor 310 can communicate with the processor 330 for added processing capabilities. The processor 330 can be configured to further include a variable data manager 315 in association with the variable data resources 320. The disk storage units may be either locally or remotely connected. With reference to FIG. 3, portions of the system 300 suitable for incorporating concepts of the present application are shown. Only portions of the system 300 that facilitate an understanding of the present application are shown. It is to be understood that although the present application is described in terms of a rendering system, the concepts described herein are equally suitable for other systems having a finishing system.

The dynamic finishing module 345 in association with the processor 330 applies one or more variable finishing parameters 355 to a variable information document such as the rendering job 305 associated with a VI transactional printing process. Note that as utilized herein, the acronym PDL generally refers to "Print Description Language" and the acronym VI generally refers to "Variable Information". A set of rules 350 can be specified by a user for determining the finishing association 355 for the rendering job 305 based on characteristics of the rendering job 305. The rendering job 305, which can include the VI data resources 320, can be received for execution and the discrete VI records associated with the job 305 can be discerned. The variable finishing parameters 355 can be applied to the rendering job 305 based on the properties required to determine a correct finishing for a given record, a job ticket resolution, and a post RIP job ticket resolution. If the finishing parameters 355 can be ascertained, then the job programming for the rendering job 305 can be finalized and processed.

The dynamically selected finishing parameters 355 can be applied to the entire document 305 and/or individual records associated with the VI data stream. If the system 300 is completely unable to discern the required information, one or more default-finishing parameters 370 can be applied to the rendering job 305 and/or the rendering job 305 can be put on hold. The user interface 325 interacts with the user of the system 300, i.e., receiving commands from the user such as finishing options and displaying job status and system status information to the user on the display screen 340. In some embodiments, a pointing device 105 as shown in FIG. 1, such as a mouse or a touchpad, can be provided. The processor 330 provides digital documents and user-programmed finishing system options to the finishing module 345 for final processing.

The finishing module 345 includes several subsystems including, but not limited to, a scaling subsystem, a rotation subsystem, and other finishing system subsystems such as, for example, a skewing and offset subsystem and a folding subsystem for providing V-folding, C-folding, Z-folding capabilities and other folding parameters to the finishing module 345. The finishing module 345 generates finished documents 360 which are finished in accordance with the user-programmed finishing parameters.

The workstation 380 is shown executing the finishing module 345 and its included functions locally; however, it is to be understood that this arrangement is for purposes of explaining the present application only. The workstation 380 may alternately be connected to a server computer which executes the finishing module 345 remotely on the server computer providing the results back to the workstation 380 for display on the display device 340. It is to be further understood that the scope of the present application is not limited to any particular arrangement of workstation and peripheral devices. A part or all of the processing of each function of embodiments described herein can be realized by the finishing module 345 and executed by a computer, including the aforementioned workstation 380. The system 300 can add actual document representations, including intermediary representations, to a set of visual "finishing" instructions for the specialty media.

Figure 4:
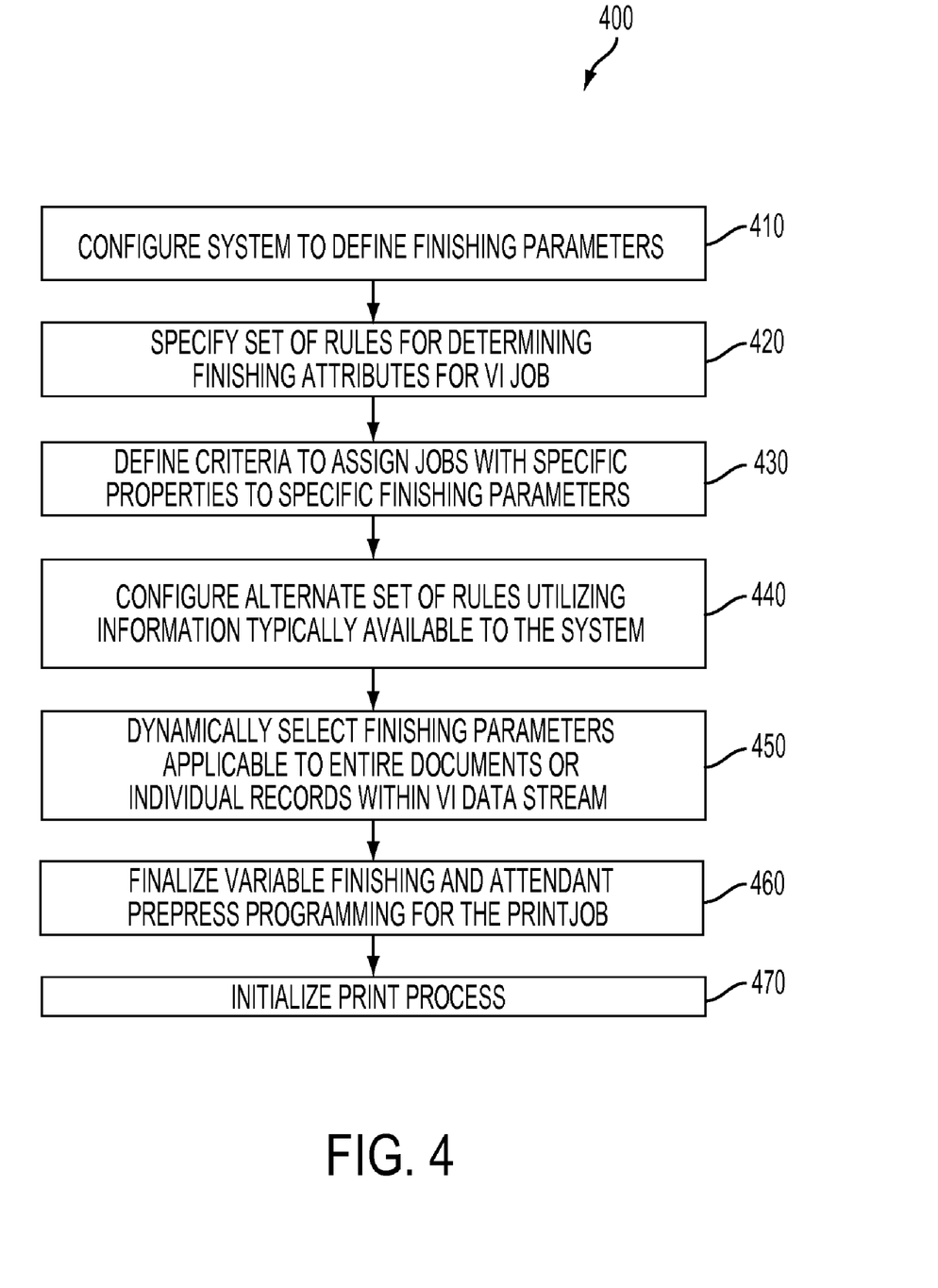
FIG. 4 illustrates a high level flow chart of operations illustrating logical operational steps of a method for configuring variable finishing parameters, in accordance with a preferred embodiment.

FIG. 4 illustrates a flow chart of operations depicting a method 400 for configuring variable finishing parameters 355, in accordance with a preferred embodiment. Note that the method 400 can be implemented in the context of a computer-useable medium that contains a program product. The method 400 depicted in FIG. 4 can also be implemented in a computer-usable medium containing a program product.

Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as, but not limited to, Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent. Thus, the method 400 and 500 described herein can be deployed as process software in the context of a computer system or data-processing system as that depicted in FIGS. 1-2.

The system 300 can be configured to define the finishing parameters 355, as illustrated at block 410. The set of rules 350 can be specified for determining the finishing attributes 355 for the VI rendering job 305, as indicated at block 420. Thereafter, as illustrated at block 430, a criterion can be defined to assign the rendering job 305 with specific properties to the specific finishing parameters 355. The user interface 325 for specifying finishing attributes 355 allows the user to define criteria that can be utilized to assign jobs with specific properties to specific finishing parameters 355.

For example, if printing variable length documents such as, statements for eventual mailing, the system 300 can be configured as follows: If number of pages is 1, then finishing can beset to C fold with inside printing. If number of pages is 2, then finishing can be set to Z fold. If the number of pages is <16, then finishing can be set to bi-fold with auto-fit booklet imposition. If the number of pages is >16, then set finishing to none with auto-fit sequential imposition. The first two documents can be mailed in a #10 envelope, whereas the third document can be mailed in an A-8 announcement envelope and the last document can be mailed in a #8 catalog envelope.

An alternate set of rules can also be configured utilizing the information typically available to the system 300, as depicted at block 440. The envisioned information can be for example, dimensions, media selection (weight, type, etc), number of pages, print quantity, customer information (generally available as metadata), document type identifiers in PDL, which is generally available in manifest processing for FFProM, etc. If the system 300 is configured for execution, the system 300 can remain in that configuration when processing the rendering job 305.

Such an approach can function with static jobs that are submitted en masse (e.g. when printing thousands of small PDF files from a content management system) and with large VI print runs. Next, as indicated at block 450, the finishing parameters 355 applicable to the entire documents or individual records associated with the VI data stream can be dynamically selected. The variable finishing parameter 355 and attendant prepress programming for the rendering job 305 can be finalized, as depicted at block 460. The print process can then be initialized, as indicated at block 470.

Figure 5:
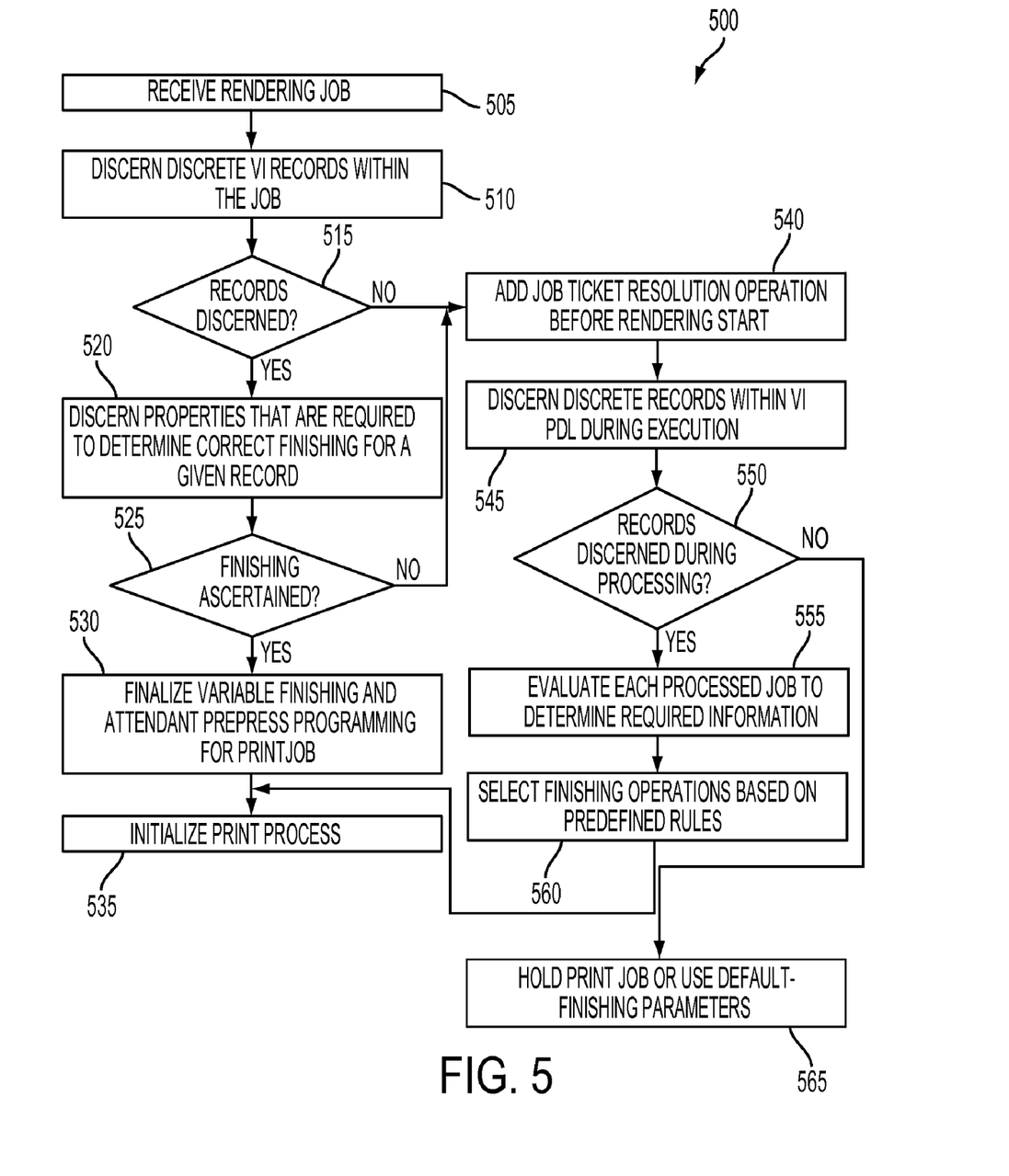
FIG. 5 illustrates a detailed flow chart of operations illustrating logical operational steps of a method for configuring variable finishing parameters for the variable information document, which can be implemented in accordance with an alternative embodiment.

FIG. 5 illustrates a detailed flow chart of operations illustrating logical operational steps of a method 500 for configuring the variable finishing parameters 355 for the variable finishing document 305, in accordance with an alternative embodiment. The rendering job 305 can be received for execution, as indicated at block 505. The discrete VI records associated with the rendering job 305 can be discerned, as depicted at block 510. Such an approach is feasible depending on the VI PDL format supported by the system 300.

A determination can be made if the VI records can be discerned, as illustrated at block 515. If the VI records can be discerned, then the properties that are required to determine the correct finishing for a given record can be discerned, as indicated at block 520. Thereafter, as depicted at block 525, another determination can be made if the finishing can be ascertained. If the finishing can be ascertained, then the job programming for the job 305 (both finishing and attendant prepress) can be finalized and the processing can be initiated, as illustrated at blocks 530 and 535. Such an approach can occur when processing newer VI PDL formats such as personalized print markup language (PPML). For example, the PPML file can be evaluated to both discern records and the number of pages for each record.

If the required properties cannot be discerned, the rendering job 305 can be processed in a mode that can add a job ticket resolution operation before rendering starts, as depicted at block 540. The discrete records associated with the VI PDL can be discerned during processing, as indicated at block 545. A determination can then be made if the records can be discerned during processing, as depicted at block 550. If the records can be discerned during processing, each processed job can be evaluated to determine the required information, as illustrated at block 555. For example, the system 300 can be able to determine discrete records from a DBM variable intelligent personalized PostScript (VIPP) files, but it cannot ascertain the number of pages in each record to absolute certainty. In this case, the system 300 can start to process the job. The number of pages for each record can be determined during the interpreting portion of the job processing. The system 300 can then determine whether it possess all the information that the rendering job requires. The finishing operations can be selected based on the predefined rules and the print process can be initialized, as depicted at block 560.

The system 300 can be able to stop the nominal processing of the rendering job 305 at the end of every operation to determine whether the system 300 possess the required information to finalize the job programming. In some cases, the system 300 may require to completely process the job 305 before the system 300 can discern the required information to finalize job programming. The document 305 can be raster image processed once again utilizing the desired prepress and finishing operations, if the desired programming is incompatible with the required finishing. For example, when processing a line-conditioned data stream (LCDS), the system 300 may not be able to discern the information required until after the system 300 has completely raster image processed the job and found record boundaries. The record boundaries (inferred from either sheet offset commands or some other PE instruction) can then be utilized to determine the number of pages created from the previously rater image processed VI PDL content.

If the required information is completely unable to discern, the rendering job 305 can be put on hold or default-finishing parameters 370 can be utilized, as indicated at block 565. Such an approach can also be implemented in an upstream system (e.g., FFOM) which can utilize the same functionality to not only program prepress and finishing parameters in the job tickets, but also to route specific records to specific print engines based on the availability of specific finishing devices. Such a rules-based, dynamic selection of the finishing attributes 355 can be configured based on the job ticket resolution and post-RIP job ticket resolution.

The method 500 described herein offers the ability to discard the raster image processed document so that the job 305 can be raster image processed once again in order to meet finishing requirements. It is believed that by utilizing the system and approach described herein, end-to-end production automation for the VI data streams that require variable finishing on a per record basis can be enabled. Furthermore, the appropriate finishing for the VI data streams that do not have clear pre-RIP record delineation can be enabled. Such a rules-based, dynamic selection of finishing attributes provides automatic finishing without requiring production knowledge in a content management submission system. The system also provides production flexibility as print shops can change document production without depending on explicit support from inflexible upstream content management system.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for configuring variable finishing parameters for a variable information document, said method comprising:

discerning at least one discrete variable information record associated with a variable information document, in response to receiving said variable information document;

detecting at least one attribute required to determine at least one finishing parameter for said variable information document and thereafter finalize said at least one finishing parameter and an attendant prepress operation for said variable information document, if said at least one finishing parameter is ascertained; and configuring a post raster image process job ticket resolution to raster image process said variable information document once again utilizing a desired prepress and a finishing operation, if said desired prepress and finishing operation is incompatible with said required information.

2. The method of claim 1 further comprising automatically applying said at least one finishing parameter to said variable information document.

3. The method of claim 1 further comprising configuring a set of rules in order to determine said at least one finishing parameter for said variable information document based on at least one characteristic associated with said variable information document.

4. The method of claim 1 further comprising dynamically applying said at least one finishing parameter to at least one individual record associated with a variable information data stream.

5. The method of claim 1 wherein detecting at least one attribute required to determine said at least one finishing parameter, further comprises configuring a job ticket resolution operation to said variable information document if said at least one attribute required to determine said at least one finishing parameter cannot be discerned.

6. The method of claim 1 further comprising determining an availability of said required information by halting processing of said variable information document at an end of every operation in order to finalize said variable information document programming.

7. The method of claim 1 wherein discerning at least one discrete variable information record associated with said variable information document, further comprises applying at least one default-finishing parameter to said variable information document if said required information cannot be discerned completely.

8. The method of claim 1 wherein discerning at least one discrete variable information record associated with said variable information document, further comprises configuring said variable information document to put on hold if said required information cannot be discerned completely.

9. A system for configuring variable finishing parameters for a variable information document, said system comprising:
  a processor;
  a data bus coupled to said processor; and
  a computer-usable medium embodying computer code, said computer-usable medium being coupled to said data bus, said computer program code comprising instructions executable by said processor and configured for:
    discerning at least one discrete variable information record associated with a variable information document, in response to receiving said variable information document;
    detecting at least one attribute required to determine at least one finishing parameter for said variable information document and thereafter finalize said at least one finishing parameter and an attendant prepress operation for said variable information document, if said at least one finishing parameter is ascertained; and
    configuring a post raster image process job ticket resolution to raster image process said variable information document once again utilizing a desired prepress and a finishing operation, if said desired prepress and finishing operation is incompatible with said required information.

10. The system of claim 9 wherein said instructions are further configured for automatically applying said at least one finishing parameter to said variable information document.

11. The system of claim 9 further comprising configuring a set of rules in order to determine said at least one finishing parameter for said variable information document based on at least one characteristic associated with said variable information document.

12. The system of claim 9 wherein said instructions are further configured for dynamically applying said at least one finishing parameter to at least one individual record associated with a variable information data stream.

13. The system of claim 9 wherein said instructions for detecting at least one attribute required to determine said at least one finishing parameter are further configured for configuring a job ticket resolution operation to said variable information document if said at least one attribute required to determine said at least one finishing parameter cannot be discerned.

14. The system of claim 9 wherein said instructions are further configured for:
  discerning said at least one discrete variable information record associated with said variable information document during processing; and
  thereafter evaluating each processed variable information document to determine an availability of required information.

15. The system of claim 9 wherein said instructions are further configured for determining an availability of said required information by halting processing of said variable information document at an end of every operation in order to finalize said variable information document programming.

16. The system of claim 9 wherein said instructions for discerning at least one discrete variable information record associated with said variable information document are further configured for applying at least one default-finishing parameter to said variable information document if said required information cannot be discerned completely.

17. A non-transitory computer-usable medium for configuring variable finishing parameters for a variable information document, said computer-usable medium embodying computer program code, said computer program code comprising computer executable instructions configured for:
  discerning at least one discrete variable information record associated with a variable information document, in response to receiving said variable information document;
  detecting at least one attribute required to determine at least one finishing parameter for said variable information document and thereafter finalize said at least one finishing parameter and an attendant prepress operation for said variable information document, if said at least one finishing parameter is ascertained; and
  configuring a cost raster image process job ticket resolution to raster image process said variable information document once again utilizing a desired prepress and a finishing operation, if said desired prepress and finishing operation is incompatible with said required information.

18. The non-transitory computer-usable medium of claim 17 wherein said embodied computer program code further comprises computer executable instructions configured for:
  automatically applying said at least one finishing parameter to said variable information document; and
  configuring a set of rules in order to determine said at least one finishing parameter for said variable information document based on at least one characteristic associated with said variable information document.

19. The non-transitory computer-usable medium of claim 17 wherein said embodied computer program code further comprises computer executable instructions configured for:
  dynamically applying said at least one finishing parameter to at least one individual record associated with a variable information data stream.

20. The non-transitory computer-usable medium of claim 17 wherein said embodied computer program code further comprises computer executable instructions configured for:
  determining an availability of said required information by halting processing of said variable information document at an end of every operation in order to finalize said variable information document programming.

* * * * *